(12) United States Patent
Chen et al.

(10) Patent No.: US 11,662,906 B2
(45) Date of Patent: May 30, 2023

(54) METHOD, ELECTRONIC DEVICE, AND COMPUTER PROGRAM PRODUCT FOR UPGRADING STORAGE SYSTEM

(71) Applicant: EMC IP Holding Company LLC, Hopkinton, MA (US)

(72) Inventors: Tao Chen, Beijing (CN); Bing Liu, Tianjin (CN); Geng Han, Beijing (CN); Jian Gao, Beijing (CN)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 0 days.

(21) Appl. No.: 17/327,166

(22) Filed: May 21, 2021

(65) Prior Publication Data

US 2022/0326853 A1 Oct. 13, 2022

(30) Foreign Application Priority Data

Apr. 9, 2021 (CN) .......................... 202110384054.2

(51) Int. Cl.
*G06F 3/06* (2006.01)
(52) U.S. Cl.
CPC ............ *G06F 3/0605* (2013.01); *G06F 3/067* (2013.01); *G06F 3/0619* (2013.01); *G06F 3/0631* (2013.01)

(58) Field of Classification Search
CPC .... G06F 3/0605; G06F 3/0619; G06F 3/0631; G06F 3/067
See application file for complete search history.

(56) References Cited

U.S. PATENT DOCUMENTS

| | | | |
|---|---|---|---|
| 2010/0229166 A1* | 9/2010 | Mopur | G06F 3/067 718/103 |
| 2014/0130055 A1* | 5/2014 | Guha | G06F 9/5011 718/104 |
| 2021/0263720 A1* | 8/2021 | Boenapalli | G06F 11/106 |

* cited by examiner

*Primary Examiner* — Masud K Khan
(74) *Attorney, Agent, or Firm* — Womble Bond Dickinson (US) LLP (57) ABSTRACT

Embodiments of the present disclosure provide a method, an electronic device, and a computer program product for upgrading a storage system. The method includes: acquiring information about a set of candidate periods related to a workload of a storage system, the storage system having a workload lower than a first predetermined threshold during the set of candidate periods; determining, based on user information of the storage system, a target period for upgrade from the set of candidate periods; and performing an upgrade operation on at least a part of components among multiple components of the storage system during the target period. In this manner, the upgrade operation for the storage system can be improved.

20 Claims, 5 Drawing Sheets

METHOD, ELECTRONIC DEVICE, AND COMPUTER PROGRAM PRODUCT FOR UPGRADING STORAGE SYSTEM

CROSS-REFERENCE TO RELATED APPLICATION

This patent application claims priority, under 35 U.S.C. § 119, of Chinese Patent Application No. 202110384054.2, filed Apr. 9, 2021, which is incorporated by reference in its entirety.

TECHNICAL FIELD

Embodiments of the present disclosure relate to the field of computers, and more particularly, to a method, an electronic device, and a computer program product for upgrading a storage system.

BACKGROUND

In the era of big data, storage systems will include many components such as processors, memories, and especially massive storage disks. In order to ensure reliability and data integrity of a storage system, for example, for data protection, it is advantageous to cause the storage system to be upgraded to a newer version, and in particular, to cause the firmware of multiple components included in the storage system to be upgraded to the latest version. However, such upgrade operation will likely affect the performance of the storage system, which in turn may affect its reliability and data integrity. That is, in a conventional storage system, there are some risks in upgrading the storage system.

SUMMARY OF THE INVENTION

Embodiments of the present disclosure provide a solution for upgrading a storage system.

In a first aspect of the present disclosure, a method for upgrading a storage system is provided. The method includes: acquiring information about a set of candidate periods related to a workload of a storage system, the storage system having a workload lower than a first predetermined threshold during the set of candidate periods; determining, based on user information of the storage system, a target period for upgrade from the set of candidate periods; and performing an upgrade operation on at least a part of components among multiple components of the storage system during the target period.

In a second aspect of the present disclosure, an electronic device is provided, including: a processor; and a memory coupled to the processor, wherein the memory has instructions stored therein which, when executed by the processor, cause the electronic device to perform actions. The actions include: acquiring information about a set of candidate periods related to a workload of a storage system, the storage system having a workload lower than a first predetermined threshold during the set of candidate periods; determining, based on user information of the storage system, a target period for upgrade from the set of candidate periods; and performing an upgrade operation on at least a part of components among multiple components of the storage system during the target period.

In a third aspect of the present disclosure, a computer program product is provided. The computer program product is tangibly stored on a computer-readable medium and includes machine-executable instructions, wherein the machine-executable instructions, when executed, cause a machine to perform any steps of the method according to the first aspect.

The Summary of the Invention part is provided to introduce the selection of concepts in a simplified form, which will be further described in the Detailed Description below. The Summary of the Invention part is neither intended to identify key features or main features of the present disclosure, nor intended to limit the scope of the present disclosure.

BRIEF DESCRIPTION OF THE DRAWINGS

The above and other objectives, features, and advantages of the present disclosure will become more apparent by describing the example embodiments of the present disclosure in more detail in combination with the accompanying drawings. In the example embodiments of the present disclosure, the same or similar reference numerals generally represent the same or similar parts. In the accompanying drawings.

DETAILED DESCRIPTION

The principles of the present disclosure will be described below with reference to some example embodiments shown in the accompanying drawings.

As used herein, the term "include" and variations thereof mean open-ended inclusion, that is, "including but not limited to." Unless specifically stated, the term "or" means "and/or." The term "based on" means "based at least in part on." The terms "an example embodiment" and "an embodiment" indicate "a group of example embodiments." The term "another embodiment" indicates "a group of additional embodiments." The terms "first," "second," etc. may refer to different or the same objects. Other explicit and implicit definitions may also be included below.

The term "component" herein may refer to hardware devices included in a storage system, including but not limited to, one or more processors, one or more memories, and multiple storage disks or multiple storage disk arrays. In some embodiments, the technical solutions of the present disclosure can be performed for only a part of the hardware devices described above, especially for the storage disks therein. This is because storage disks are the largest number of hardware devices included in a storage system, and thus the process of upgrading (and, additionally or alternatively, subsequently reactivating) them will occupy a large amount of computing resources and may cause the performance of the storage system to be degraded.

In some embodiments, the term "upgrade" or "upgrade operation" herein may refer to upgrading a component, including but not limited to, upgrading the firmware of the component, for example, performing firmware upgrade on a storage disk. It will be understood that the upgraded component will contribute to the reliability and data integrity of the storage system.

As discussed above, during the process of upgrading a storage system, there may be an impact on the performance of the storage system. In some solutions, an off-line upgrade operation can be taken, i.e., the upgrade is performed while the storage system is not in service, but this will cause the storage service to stop and require an administrator to perform corresponding operations. For example, it takes about 10 seconds to download the firmware for storage disks and activate it on one storage disk. If the storage system includes a large number of storage disks, it may cause long-term downtime. In some solutions, an online upgrade operation can be taken, for example, the online disk firmware upgrade method described in U.S. patent application Ser. No. 14/789,659, the entire content of which is incorporated herein by reference. In the case of an online upgrade operation, a storage disk to be upgraded will first experience a short service pause, and when the upgrade is complete, this storage disk will be reactivated by the storage system through a series of operations for data storage. During the online upgrade process described above, the storage system will be in a performance degradation state, and since the process of reactivating the upgraded storage disk takes several minutes, it means that the storage system will be in a performance degradation state for a long period of time. For example, assuming that the above upgrade and reactivation operations take 15 minutes per storage disk, if the storage system includes 35 groups of storage disks (e.g., redundant array of independent disks (RAID) 6), and each group of storage disks includes 14 storage disks, it would take nearly 122.5 hours to perform the upgrade process for the storage disks of the storage system. Even if the upgrade is performed at the maximum parallelism without affecting data reliability, i.e., 35 storage disks (one storage disk per RAID) are upgraded at the same time, the above upgrade process still needs to take nearly 3.5 hours. Therefore, it is expected that the performance degradation state of the storage system will not affect the use of the storage system.

In order to address, at least in part, the above disadvantages, the embodiments of the present disclosure provide a solution for upgrading a storage system. Based on usage information of the storage system, this solution can screen out a target period for upgrade and multiple target components to be upgraded, and perform an upgrade operation on the multiple target components of the storage system during the target period. In this manner, even if the storage system is in a performance degradation state due to the upgrade operation, the processing of a current task by the storage system will not be affected.

Figure 1:
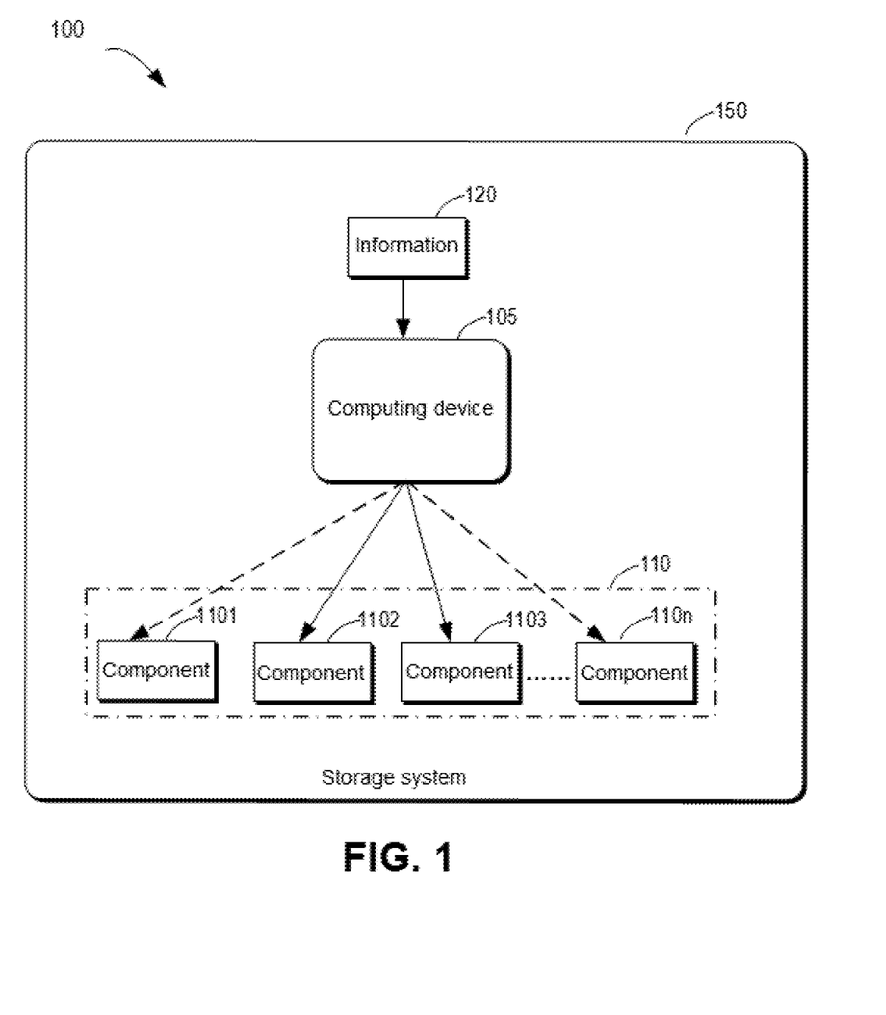
FIG. 1 illustrates a schematic diagram of an example environment according to embodiments of the present disclosure.

FIG. 1 illustrates a schematic diagram of example environment 100 according to embodiments of the present disclosure, in which a device and/or a method according to embodiments of the present disclosure can be implemented. As shown in FIG. 1, as shown in FIG. 1, the example environment may include storage system 150. Storage system 150 may include computing device 105 for processing various operations on data, including but not limited to at least one of the following: data storage, data de-duplication, data backup and recovery, information analysis, information collection, and control over storage system upgrades. The computing device may be any device with a computing capability. As a non-limiting example, the computing device may be any type of fixed computing device, mobile computing device, or portable computing device, including but not limited to, desktop computers, laptops, notebook computers, netbook computers, tablet computers, smart phones, and the like. All or a portion of components of the computing device may be distributed in a cloud. The computing device may also adopt a cloud-edge architecture.

Storage system 150 may include multiple components 110 for data storage, and the multiple components may include a processor and a memory (not shown) for the various data storage processing described above. Multiple components 110 may also include multiple storage disk arrays (e.g., RAID), and thus include multiple storage disks 1101, 1102, 1103 to 110$n$ (sometimes referred to herein simply as disks). The storage disk can be various types of devices with a storage function, including but not limited to, a hard disk drive (HDD), a solid state disk (SSD), a removable disk, any other magnetic storage device and any other optical storage device, or any combination thereof. In order to enable storage system 150 to operate multiple storage disks 1101 to 110$n$, each storage disk may have firmware.

Computing device 105 may be configured to selectively perform an upgrade operation for multiple components based on information 120 associated with the storage system during a target period among multiple candidate periods. The multiple candidate periods may be multiple periods in the future. The multiple candidate periods may be valley periods of multiple workloads. Additionally or alternatively, computing device 105 may be configured to perform an upgrade operation for at least a part of components (e.g., storage disk arrays 1102 and 1103) among the multiple components and cancel or delay an upgrade operation for at least another part of components (e.g., storage disks 1101 and 110$n$) among the multiple components during the target period described above based on information 120 associated with the storage system. In some embodiments, the upgrade operation may be a firmware upgrade operation.

In some embodiments, information 120 associated with the storage system includes, but is not limited to, at least one of the following: real-time information and/or historical information used for reads and writes and related to the processor and/or the memory, such as capacity and utilization; real-time read and write information and/or historical read and write information related to each of the multiple storage disks, such as throughput, utilization, delay, I/O queues, etc.; and user information, such as a service level agreement (SLA) between a provider of the storage service and the user. The SLA may define parameters for measuring service levels and may include data storage reliability, storage service availability, etc. The storage system should satisfy (e.g., be not lower than) various parameters defined by the SLA.

Based on information 120, the computing device can determine one or more target periods. During the target period, the storage system has a low workload (e.g., lower than a first predetermined threshold), and performing an upgrade operation can also satisfy the SLA. Based on information 120, the computing device can also determine a part of components to be upgraded during the target period, wherein this part of components have a low component workload (e.g., lower than a second predetermined threshold) during that target period so as to further reduce the impact of the upgrade operation on the storage service provided by the storage system. The above determination process can be done using a machine learning model trained based on historical information or various workload determination algorithms based on real-time information.

The process according to embodiments of the present disclosure will be described in detail below with reference to FIGS. 2 to 6. For ease of understanding, specific data mentioned in the following description are all examples and are not intended to limit the scope of protection of the present disclosure. It should be understood that embodiments described below may also include additional actions not shown and/or may omit actions shown, and the scope of the present disclosure is not limited in this regard.

Figure 2:
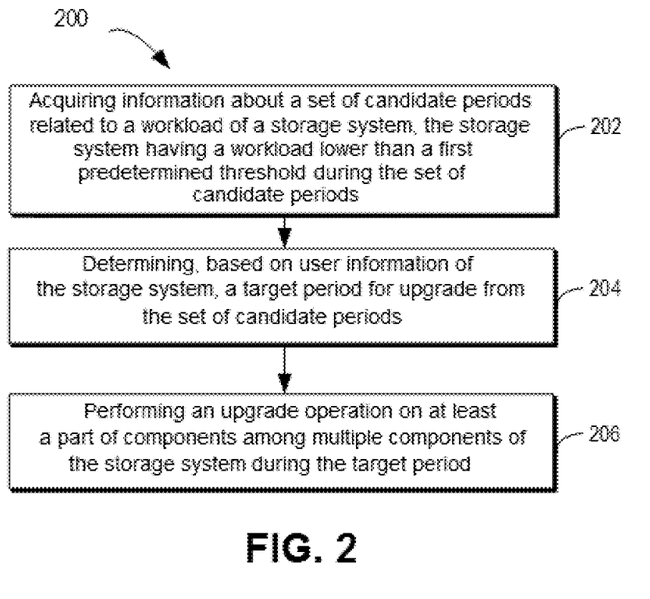
FIG. 2 illustrates a flow chart of a process of upgrading a storage system according to embodiments of the present disclosure.

FIG. 2 illustrates a flow chart of process 200 of upgrading a storage system according to embodiments of the present disclosure. Process 200 can be implemented at computing device 105 shown in FIG. 1. As shown in FIG. 2, at 202, the computing device can acquire information about a set of candidate periods related to a workload of a storage system. During the set of candidate periods, the storage system has a workload lower than a first predetermined threshold. In other words, the storage system can be in a relatively idle state during the candidate periods. In some embodiments, the information about each candidate period may include a time at which the candidate period begins, a time at which the candidate period ends, and, additionally or alternatively, a duration of this candidate period. In some embodiments, the first predetermined threshold may be set such that the processing capability of the storage system for other tasks and/or operations is not affected during the upgrade operation. For example, the requirement in the SLA that is related to the processing delay can be satisfied.

In some embodiments, the workload of the storage system may be indicated by the busyness (in percentage) of multiple components (e.g., a storage disk array), and thus the first predetermined threshold may also be a predetermined busyness threshold. The predetermined busyness threshold may be set such that the processing capability of the storage system for other tasks and/or operations is not affected during the upgrade operation. Since the amount of work to be executed by the storage system is not exactly the same at different times, the busyness of the storage system will fluctuate, and therefore, a set of candidate periods can be determined according to the busyness of the storage system (in some embodiments, a predicted busyness, which can indicate a predicted workload). It will be understood that other parameters that can characterize the workload of the storage system can also be used, such as the utilization of the processor and/or the memory.

In some embodiments, information about the set of candidate periods can be predetermined and stored in the storage device for access by the computing device when needed. In some embodiments, the computing device can determine a predicted workload (e.g., predicted busyness) over a future period of time based on computing resource information (such as the respective capacity and/or utilization of one or more processors and/or one or more memories) and read and write information (such as the respective throughput, utilization, delay, and/or I/O queues of multiple storage disks) of the storage system. Based on the determined predicted workload, the computing device can determine (e.g., select) a set of candidate periods from the future period of time, wherein the storage system has a workload lower than the first predetermined threshold during this set of candidate periods as previously described.

In some embodiments, the predicted workload can be determined by a trained machine learning model. In some embodiments, the machine learning model can be based on a random forest algorithm. In some embodiments, the machine learning model can also be based on a support vector machine (SVM) model, a Bayesian model, and various neural network models, such as a convolutional neural network (CNN), a recurrent neural network (RNN), and a deep neural network (DNN).

Figure 3:
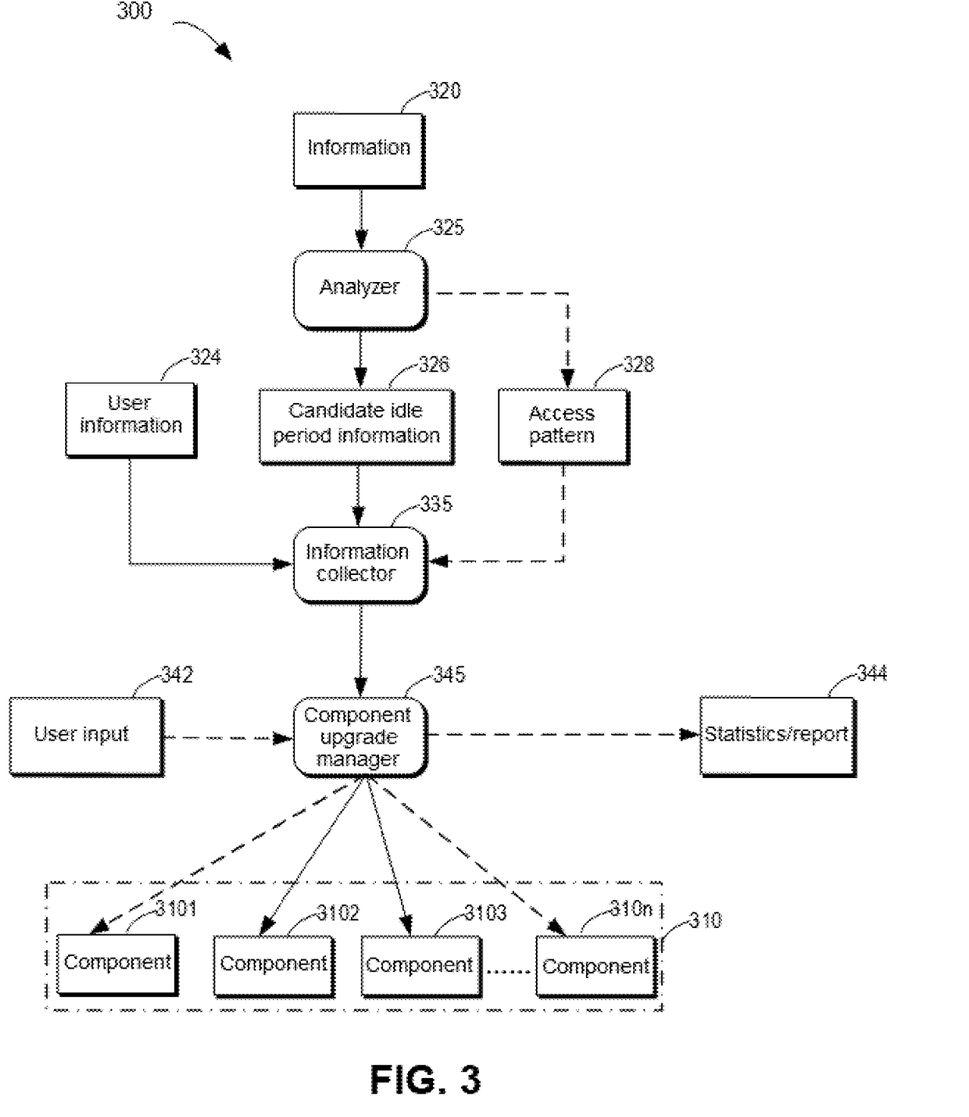
FIG. 3 illustrates a schematic diagram of a process of upgrading a storage system according to embodiments of the present disclosure.

Detailed description will be given with reference to FIG. 3 now, which illustrates a schematic diagram of process 300 of upgrading a storage system according to embodiments of the present disclosure. As shown in FIG. 3, computing device 105 may include analyzer 325, and a machine learning model (not shown) may be deployed at analyzer 325. It can be trained based on information including historical time information, historical computing resource information (such as the respective historical capacity and/or historical utilization of one or more processors and/or one or more memories), and/or historical read and write information (such as the respective historical throughput, historical utilization, historical delay of multiple storage disks), so as to describe the correlation between the workload of the storage system and the time, the computing resource information, and/or the read and write information. Therefore, the machine learning model can learn, according to the above information related to access behaviors to the storage system, at what times the size of the workload of the storage system may be high or low, and after experiencing what kinds of computing resources and/or read and write curves it may increase or decrease.

For example, (multiple) users of the storage system may perform data backup at a fixed time period every weekend, so the machine learning model can learn that the storage resources (including but not limited to a part of storage disks) allocated to (the multiple) users will be busy during this fixed time period. For another example, some storage disks (e.g., storage disk arrays that are not activated) of the storage system may not be used for data storage temporarily, so the machine learning model can learn that these storage disks will be idle in all periods. For yet another example, a specific user may have specific access behavioral characteristics, such as performing a data restoration operation after a data backup operation is completed, which is common for virtual machine (VM) backups, because users usually want to verify and/or test the backed-up data as soon as possible. In such case, the storage disk array associated with that specific user will have a high component-level workload over a period of time due to such work task. Accordingly, the trained machine learning model can relatively accurately predict the overall workload of the storage system and/or workloads of components in the storage system. The error between the prediction result of the trained machine learning model and the actual result was tested to be small.

Analyzer 325 can use the trained machine learning model to determine a predicted workload (e.g., predicted busyness) based on information 320 such as current time information, current computing resource information, and/or current read and write information. Based on the determined predicted workload, the computing device can determine (e.g., select), from a future period of time, a set of candidate periods when the storage system is relatively idle, and accordingly determine candidate idle period information 326, including but not limited to the start time, end time, duration, and corresponding predicted workload of those periods.

It will be understood that determining the predicted workload according to the machine learning model is only one implementation of the present disclosure, and other approaches that can determine the predicted workload are also applicable to the present disclosure. In some embodiments, if a work plan of the storage system is known, the set of candidate periods can be determined based on the work plan of the storage system.

Referring back to FIG. 2, at 204, the computing device can determine, based on user information of the storage system, a target period for upgrade from the set of candidate periods. Specifically, not every candidate period in a set of candidate periods is suitable for the upgrade operation. For example, even if the workload of the storage system is relatively low during such candidate period, upgrading some components of the storage system will affect the availability of this part of components, and then may affect the use of storage services by users related to this part of components. Therefore, in order to at least meet the users' usage requirements for storage services, it is necessary to further screen the candidate time periods to determine one or more better target time periods. Some embodiments of determining the target period for upgrade will be described specifically below with reference to FIG. 5 and FIG. 3.

At 206, the computing device can perform an upgrade operation on at least a part of components among multiple components of the storage system during the target period. In some embodiments, the multiple components may include one or more processors, one or more memories, and multiple storage disks. The computing device can perform firmware upgrade on at least a part of components (e.g., multiple storage disks) among the multiple components during the target period. In some embodiments, since not all components require firmware upgrade (e.g., in cases where the upgrade is only for components of specific signals), the computing device can first acquire a list of components that require firmware upgrade. In some embodiments, the computing device can determine the number of components that can be upgraded during the target period according to the duration of the target period, the average time taken to upgrade each component, and/or the upgrade parallelism (i.e., the number of components, such as storage disks, that can be upgraded at the same time). In some embodiments, given that not all components are idle during the target period, a part of components that are relatively idle can be determined therefrom for upgrade, to avoid the risk that may be caused by upgrading busy components. Some embodiments of determining components on which the upgrade operation will be performed during the target period will be described specifically below with reference to FIG. 5 and FIG. 3.

In this manner, it is possible to perform upgrade operations on appropriate components at the appropriate time, without affecting the capability of the storage system to provide storage services to users.

Figure 4:
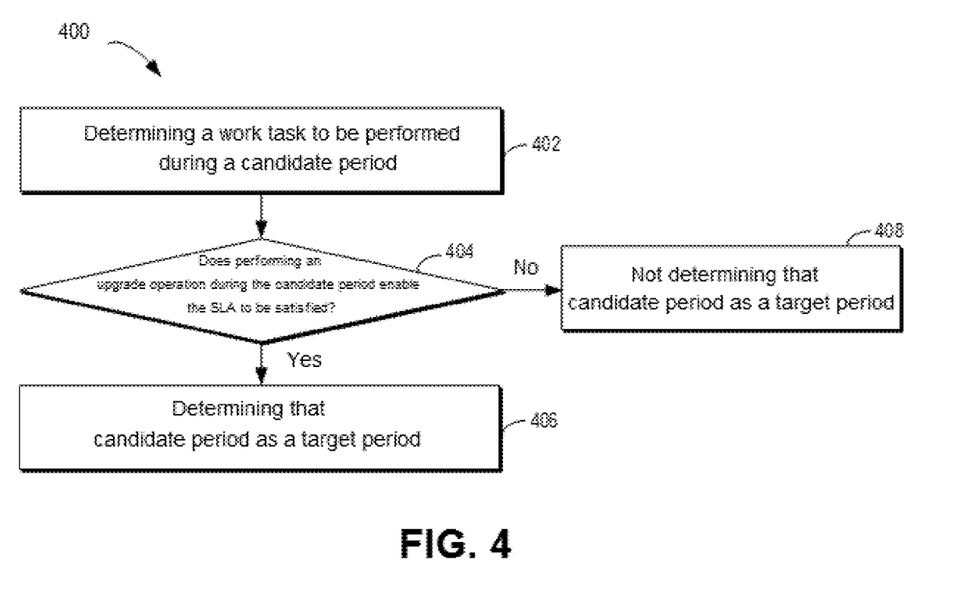
FIG. 4 illustrates a flow chart of a process of determining a target period for upgrade according to embodiments of the present disclosure.

FIG. 4 illustrates a flow chart of process 400 of determining a target period for upgrade according to embodiments of the present disclosure. Process 400 can be implemented at computing device 105 shown in FIG. 1. Process 400 can be a specific embodiment of 204 in FIG. 2. It will be understood that process 400 can be performed for each of the candidate periods to determine the optimal one or more target periods, or the process can be no longer performed for the remaining candidate periods after an appropriate candidate period has been determined as the target period. Process 400 will be described in detail below with reference to FIG. 3.

In some embodiments, user information 324, along with candidate idle period information 326 described above, and additionally or alternatively access pattern 328 (which will be discussed in detail with reference to FIG. 5) may be acquired and stored by information collector 335 of computing device 105. The above information may be provided by information collector 335 to component upgrade manager 345 of computing device 105 for use by component upgrade manager 345 to determine which components will be upgraded. In some embodiments, user information 324 may include a service level agreement (SLA) associated with a user of the system. As previously discussed, the SLA may define parameters for measuring service levels and may include reliability of data storage, availability of storage services, etc. The storage system should satisfy (e.g., be not lower than) various parameters defined by the SLA.

Referring back to FIG. 4, at 402, the computing device can determine a work task to be performed during one candidate period among the set of candidate periods. At 404, the computing device can determine, based on the work task, whether performing the upgrade operation during the candidate period enables the SLA to be satisfied. Now continue to refer to FIG. 3 for illustration, determining whether the SLA can be satisfied can be completed by component upgrade manager 345 based on various received information. In some embodiments, if the work task includes at least one of a data backup task and a data recovery task, the computing device (e.g., component upgrade manager 345) can determine that the SLA cannot be satisfied and therefore choose not to perform upgrade during that candidate period. Specifically, when a specific user wants to perform a data backup task and/or a data recovery task, even if the workload of the storage system is not high during that candidate period, performing an upgrade operation will still make it impossible to satisfy the SLA, so any upgrade operation during that candidate period can be disabled. In other words, that candidate period will not be determined as the target period.

In some embodiments, if the work task includes at least one of a data recovery task, a data cleaning task, and a file system verification task, the computing device (e.g., component upgrade manager 345) can determine a first time at which such work task is previously executed and determine a time difference between the first time and a current time. If the time difference is greater than a time difference threshold, it can be determined that the SLA cannot be satisfied. Specifically, the priority of work tasks such as a data recovery task, a data cleaning task, and a file system verification task is not particularly high, they can usually be postponed. However, if these tasks are not performed for a long time (for example, exceeding the time difference threshold), the availability and capacity of the storage system may be affected, and then the SLA cannot be satisfied. Therefore, any upgrade operation during that candidate period can be disabled. In other words, that candidate period will not be determined as the target period.

In some embodiments, the above process can be automatically completed by component upgrade manager 345. In some embodiments, the above process can be notified to a user administrator by component upgrade manager 345 by way of statistics/report 344, and further evaluated by the user administrator, who then, for example, disables and/or enables any upgrade operation during that candidate period through such as user input 342 that is input via a user interface.

Referring back to FIG. 4, if it is determined that the SLA can be satisfied, the computing device may, at 406, determine that candidate period as the target period. Otherwise, if it is determined that the SLA cannot be satisfied, the computing device may, at 408, not determine that candidate period as the target period.

In this manner, it is possible to further select, from multiple candidate periods during which the workload is low, a target period with low impact on users for upgrade of the storage system, so that the impact of upgrading the storage system on users' use of the storage service is reduced.

Figure 5:
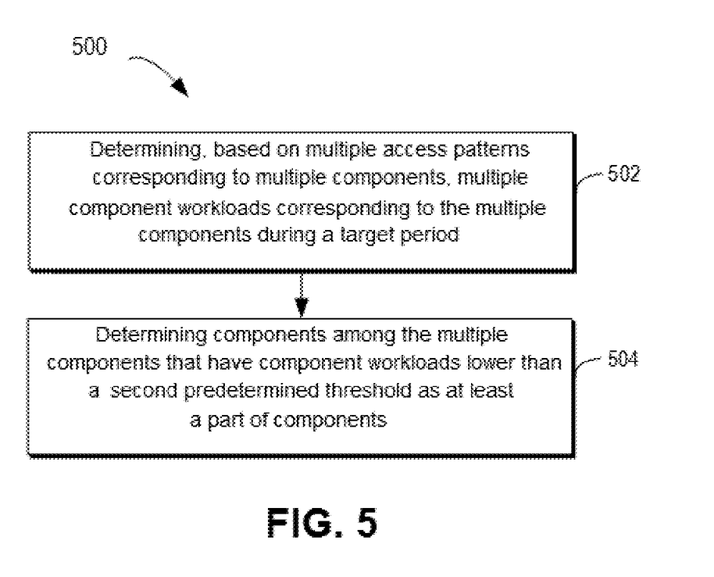
FIG. 5 illustrates a flow chart of a process of determining components on which an upgrade operation is to be performed during a target period according to embodiments of the present disclosure.

FIG. 5 illustrates a flow chart of process 500 of determining components on which an upgrade operation is to be performed during a target period according to embodiments of the present disclosure. Process 500 can be implemented at computing device 105 shown in FIG. 1. Process 500 can be a specific embodiment of 206 in FIG. 2. It will be understood that process 500 can be performed for each of multiple components to be upgraded to determine at least a part of components that will be upgraded during the target period.

At 502, the computing device can determine, based on multiple access patterns corresponding to the multiple components, multiple component workloads corresponding to the multiple components during the target period, each of the multiple access patterns indicating first information related to access to a corresponding component. The term "component workload" herein refers to a workload at an individual component level, and may refer to at least one of the following: a workload of a processor or a processor set, a workload of a memory or a memory set, and a workload of a storage disk or a storage disk array. Process 500 will be described in detail below with reference to FIG. 3.

Specifically, the analyzer of computing device 105 can determine multiple access patterns 328 based on read and write information associated with multiple components 310 in information 320, wherein each access pattern will correspond to a corresponding component. Access patterns 328 can be collected by information collector 335 and provided by information collector 335 to component upgrade manager 345 for controlling the execution of upgrade operations on a part of components. In some embodiments, the first information indicated by access pattern 328 includes at least one of the following: a utilization state of a corresponding component, and information about behavioral characteristics of a user when accessing the corresponding component. For example, as discussed above, some storage disks of the storage system may not be used for data storage temporarily, and/or specific users may have specific access behavioral characteristics, thus affecting the workload of related components. Thus, such information can be used to determine the access pattern of each component. The access pattern can be determined by the trained machine learning model described above. For example, the computing device can determine whether each storage disk array will be busy or idle during the target period.

Referring back to FIG. 5, at 504, the computing device determines components among the multiple components that have component workloads lower than a second predetermined threshold as the at least a part of components. In some embodiments, the component workload may be indicated by the busyness (in percentage) of a single storage disk array, and thus the second predetermined threshold may also be a predetermined busyness threshold. This predetermined busyness threshold may be set such that the processing capability for other tasks and/or operations is not affected during the upgrade operation on that component. Since the amount of work to be performed by this component is not exactly the same at different times, the busyness will fluctuate, and thus it can be determined whether to upgrade that component according to the busyness of that component (in some embodiments, the predicted busyness, which can indicate a predicted workload).

Now, continue to refer to FIG. 3 for illustration. For example, component upgrade manager 345 can determine, based on the access pattern associated with each of multiple components 310, that at least a part of components (e.g., storage disks 3102 and 3103, which may belong to idle RAIDs) can be upgraded during the target period, while some other components (e.g., storage disks 3101 and 310n, which may belong to busy RAIDs) cannot be upgraded during the target period. As a result, the computing device can perform (e.g., via component upgrade manager 345) an upgrade operation, such as firmware upgrade, on the at least a part of components (e.g., storage disks 3102 and 3103), and can cancel or delay the upgrade operation for at least another part of components (e.g., storage disks 3101 and 310n) among multiple components 310, wherein the at least another part of components include components having component workloads not lower than a second predetermined threshold. In some embodiments, when to perform an upgrade operation on the at least another part of components that have been canceled or delayed can be determined again according to the method described herein until there are no more components to be upgraded.

In this manner, relatively idle components can be selected for upgrade during the target period, so that the impact of the upgrade of the storage system on users' use of storage services is further reduced.

Figure 6:
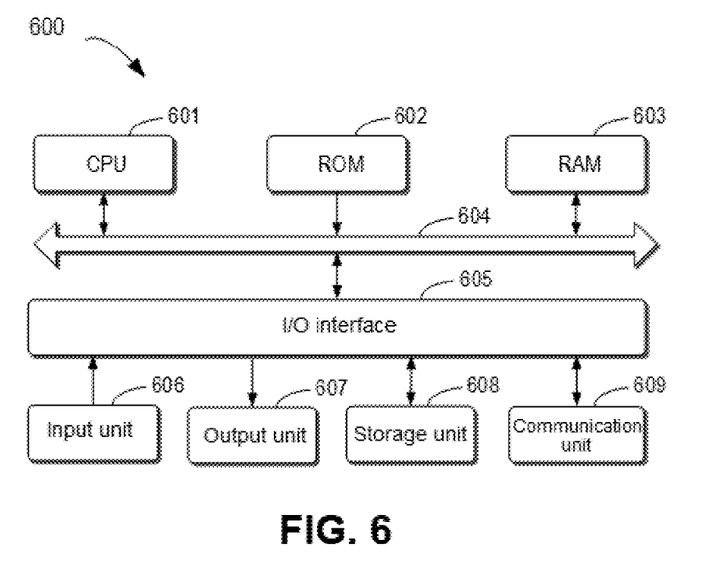
FIG. 6 illustrates a block diagram of an example device that can be used to implement embodiments of the present disclosure.

FIG. 6 illustrates a schematic block diagram of example electronic device 600 that can be used to implement the embodiments of the present disclosure. For example, electronic device 600 can be used to implement computing device 105 shown in FIG. 1 or computing device 305 shown in FIG. 3. As shown in the figure, device 600 includes central processing unit (CPU) 601 that may execute various appropriate actions and processing according to computer program instructions stored in read-only memory (ROM) 602 or computer program instructions loaded from storage unit 608 into random access memory (RAM) 603. In RAM 603, various programs and data required for operations of device 600 may also be stored. CPU 601, ROM 602, and RAM 603 are connected to each other through bus 604. Input/output (I/O) interface 605 is also connected to bus 604.

Multiple components in device 600 are connected to I/O interface 605, including: input unit 606, such as a keyboard and a mouse; output unit 607, such as various types of displays and speakers; storage unit 608, such as a magnetic disk and an optical disc; and communication unit 609, such as a network card, a modem, and a wireless communication transceiver. Communication unit 609 allows device 600 to exchange information/data with other devices via a computer network, such as the Internet, and/or various telecommunication networks.

Processing unit 601 executes various methods and processing described above, e.g., any one of processes 200 to 500. For example, in some embodiments, any one of processes 200 to 500 may be implemented as a computer software program or a computer program product that is tangibly included in a machine-readable medium, e.g., storage unit 608. In some embodiments, part or all of the computer program may be loaded and/or installed to device 600 via ROM 602 and/or communication unit 609. When the computer program is loaded into RAM 603 and executed by CPU 601, one or more steps of any one of processes 200 to 500 described above may be performed. Alternatively, in other embodiments, CPU 601 may be configured in any other suitable manner (e.g., by means of firmware) to implement any one of processes 200 to 500.

The present disclosure may be a method, an apparatus, a system, and/or a computer program product. The computer program product may include a computer-readable storage medium on which computer-readable program instructions for performing various aspects of the present disclosure are loaded.

The computer-readable storage medium may be a tangible device capable of retaining and storing instructions used by an instruction-executing device. For example, the computer-readable storage medium may be, but is not limited to, an electric storage device, a magnetic storage device, an optical storage device, an electromagnetic storage device, a semiconductor storage device, any non-transient storage device, or any suitable combination of the foregoing. More specific examples (a non-exhaustive list) of the computer-readable storage medium include: a portable computer disk, a hard disk, a random access memory (RAM), a read-only memory (ROM), an erasable programmable read-only memory (EPROM or flash memory), a static random access memory (SRAM), a portable compact disc read-only memory (CD-ROM), a digital versatile disc (DVD), a memory stick, a floppy disk, a mechanical encoding device, for example, a punch card or a raised structure in a groove with instructions stored thereon, and any appropriate combination of the foregoing. The computer-readable storage medium used herein is not to be interpreted as transient signals per se, such as radio waves or other freely propagating electromagnetic waves, electromagnetic waves propagating through waveguides or other transmission media (e.g., light pulses through fiber-optic cables), or electrical signals transmitted through electrical wires.

The computer-readable program instructions described herein may be downloaded from a computer-readable storage medium to various computing/processing devices or downloaded to an external computer or external storage device via a network, such as the Internet, a local area network, a wide area network, and/or a wireless network. The network may include copper transmission cables, fiber optic transmission, wireless transmission, routers, firewalls, switches, gateway computers, and/or edge servers. A network adapter card or network interface in each computing/processing device receives computer-readable program instructions from the network and forwards the computer-readable program instructions for storage in a computer-readable storage medium in each computing/processing device.

The computer program instructions for executing the operation of the present disclosure may be assembly instructions, instruction set architecture (ISA) instructions, machine instructions, machine-dependent instructions, microcode, firmware instructions, state setting data, or source code or object code written in any combination of one or more programming languages, the programming languages including object-oriented programming language, such as Smalltalk, C++, and the like, and conventional procedural programming languages, such as the C language or similar programming languages. The computer-readable program instructions may be executed entirely on a user's computer, partly on a user's computer, as a stand-alone software package, partly on a user's computer and partly on a remote computer, or entirely on a remote computer or a server. In a case where a remote computer is involved, the remote computer can be connected to a user computer through any kind of networks, including a local area network (LAN) or a wide area network (WAN), or can be connected to an external computer (for example, connected through the Internet using an Internet service provider). In some embodiments, an electronic circuit, such as a programmable logic circuit, a field programmable gate array (FPGA), or a programmable logic array (PLA), is customized by utilizing state information of the computer-readable program instructions. The electronic circuit may execute the computer-readable program instructions to implement various aspects of the present disclosure.

Various aspects of the present disclosure are described here with reference to flow charts and/or block diagrams of the method, the apparatus (system), and the computer program product according to the embodiments of the present disclosure. It should be understood that each block of the flow charts and/or block diagrams and combinations of blocks in the flow charts and/or block diagrams may be implemented by computer-readable program instructions.

These computer-readable program instructions may be provided to a processing unit of a general-purpose computer, a special-purpose computer, or a further programmable data processing apparatus, thereby producing a machine, such that these instructions, when executed by the processing unit of the computer or the further programmable data processing apparatus, produce means for implementing functions/actions specified in one or more blocks in the flow charts and/or block diagrams. These computer-readable program instructions may also be stored in a computer-readable storage medium, and these instructions cause a computer, a programmable data processing apparatus, and/or other devices to operate in a specific manner; and thus the computer-readable medium having instructions stored includes an article of manufacture that includes instructions that implement various aspects of the functions/actions specified in one or more blocks in the flow charts and/or block diagrams.

The computer-readable program instructions may also be loaded to a computer, a further programmable data processing apparatus, or a further device, so that a series of operating steps may be performed on the computer, the further programmable data processing apparatus, or the further device to produce a computer-implemented process, such that the instructions executed on the computer, the further programmable data processing apparatus, or the further device may implement the functions/actions specified in one or more blocks in the flow charts and/or block diagrams.

The flow charts and block diagrams in the drawings illustrate the architectures, functions, and operations of possible implementations of the systems, methods, and computer program products according to various embodiments of the present disclosure. In this regard, each block in the flow charts or block diagrams may represent a module, a program segment, or part of an instruction, the module, program segment, or part of an instruction including one or more executable instructions for implementing specified logical functions. In some alternative implementations, functions marked in the blocks may also occur in an order different from that marked in the accompanying drawings. For example, two successive blocks may actually be executed in parallel substantially, and sometimes they may also be executed in an inverse order, which depends on involved functions. It should be further noted that each block in the block diagrams and/or flow charts as well as a combination of blocks in the block diagrams and/or flow charts may be implemented using a dedicated hardware-based system that executes specified functions or actions, or using a combination of special hardware and computer instructions.

Various implementations of the present disclosure have been described above. The foregoing description is illustrative rather than exhaustive, and is not limited to the disclosed implementations. Numerous modifications and alterations are apparent to persons of ordinary skill in the art without departing from the scope and spirit of the illustrated implementations. The selection of terms used herein is intended to best explain the principles and practical applications of the implementations or the improvements to technologies on the market, or to enable other persons of ordinary skill in the art to understand the implementations disclosed herein.

The invention claimed is:

1. A method for upgrading a storage system, including:
acquiring information about a set of candidate periods related to a workload of a storage system, the storage system having a workload lower than a first predetermined threshold during the set of candidate periods;
determining, by a machine learning model that is trained based on user information of the storage system, a target period for upgrade from the set of candidate periods; and
performing a firmware upgrade operation on at least a part of components among multiple components of the storage system during the target period,
wherein the user information includes a service level agreement (SLA) associated with a user of the system, and determining the target period for the upgrade includes:
determining a work task to be performed during a candidate period among the set of candidate periods;
determining, based on the work task, whether a performance impact to the work task as a result of performing the firmware upgrade operation during the candidate period enables the SLA to be satisfied; and
determining the candidate period as the target period for the firmware upgrade operation if it is determined that the SLA can be satisfied.

2. The method according to claim 1, wherein the multiple components include multiple storage disks, and performing the firmware upgrade operation includes:
performing the firmware upgrade operation on at least a part of storage disks among the multiple storage disks.

3. The method according to claim 1, wherein acquiring information about the set of candidate periods includes:
determining a predicted workload over a future period of time based on computing resource information and read and write information of the storage system; and
determining the set of candidate periods from the future period of time based on the predicted workload.

4. The method according to claim 1, wherein determining whether the performance impact to the work task as a result of performing the firmware upgrade operation during the candidate period enables the SLA to be satisfied includes:
determining that the SLA cannot be satisfied if the work task includes at least one of a data backup task and a data recovery task.

5. The method according to claim 1, wherein determining whether the performance impact to the work task as a result of performing the firmware upgrade operation during the candidate period enables the SLA to be satisfied includes:
determining a first time at which the work task is previously executed if the work task includes at least one of a data recovery task, a data cleaning task, and a file system verification task;
determining a duration since the work task was previously executed based on a time difference between the first time and a current time; and
determining that the SLA cannot be satisfied if the time difference is greater than a time difference threshold.

6. The method according to claim 1, wherein performing the firmware upgrade operation on the at least the part of the components includes:
determining, based on multiple access patterns corresponding to the multiple components, multiple component workloads corresponding to the multiple components during the target period, each of the multiple access patterns indicating first information related to access to a corresponding component; and
determining components among the multiple components that have component workloads lower than a second predetermined threshold as the at least the part of the components.

7. The method according to claim 6, further including:
canceling or delaying the firmware upgrade operation on components among the multiple components that have component workloads not lower than the second predetermined threshold.

8. The method according to claim 6, wherein the multiple access patterns are determined based on read and write information associated with the multiple components.

9. The method according to claim 6, wherein the first information includes information about behavioral characteristics of a user when accessing the corresponding component.

10. An electronic device, including:
a processor; and
a memory coupled to the processor and having instructions stored therein, wherein the instructions, when executed by the processor, cause the electronic device to execute actions including:
acquiring information about a set of candidate periods related to a workload of a storage system, the storage system having a workload lower than a first predetermined threshold during the set of candidate periods;
determining, by a machine learning model that is trained based on user information of the storage system, a target period for upgrade from the set of candidate periods; and
performing a firmware upgrade operation on at least a part of components among multiple components of the storage system during the target period,
wherein the user information includes a service level agreement (SLA) associated with a user of the system, and determining the target period for the upgrade includes:
determining a work task to be performed during a candidate period among the set of candidate periods;
determining, based on the work task, whether a performance impact to the work task as a result of performing the firmware upgrade operation during the candidate period enables the SLA to be satisfied; and
determining the candidate period as the target period for the firmware upgrade operation if it is determined that the SLA can be satisfied.

11. The device according to claim 10, wherein the multiple components include multiple storage disks, and performing the firmware upgrade operation includes:
performing the firmware upgrade operation on at least a part of storage disks among the multiple storage disks.

12. The device according to claim 10, wherein acquiring information about the set of candidate periods includes:
determining a predicted workload over a future period of time based on computing resource information and read and write information of the storage system; and
determining the set of candidate periods from the future period of time based on the predicted workload.

13. The device according to claim 10, wherein determining whether the performance impact to the work task as a result of performing the firmware upgrade operation during the candidate period enables the SLA to be satisfied includes:
determining that the SLA cannot be satisfied if the work task includes at least one of a data backup task and a data recovery task.

14. The device according to claim 10, wherein determining whether the performance impact to the work task as a result of performing the firmware upgrade operation during the candidate period enables the SLA to be satisfied includes:
determining a first time at which the work task is previously executed if the work task includes at least one of a data recovery task, a data cleaning task, and a file system verification task;
determining a duration since the work task was previously executed based on a time difference between the first time and a current time; and
determining that the SLA cannot be satisfied if the time difference is greater than a time difference threshold.

15. The device according to claim 10, wherein performing the firmware upgrade operation on the at least the part of the components includes:
determining, based on multiple access patterns corresponding to the multiple components, multiple component workloads corresponding to the multiple components during the target period, each of the multiple access patterns indicating first information related to access to a corresponding component; and
determining components among the multiple components that have component workloads lower than a second predetermined threshold as the at least the part of the components.

16. The device according to claim 15, wherein the actions further include:
canceling or delaying the firmware upgrade operation on components among the multiple components that have component workloads not lower than the second predetermined threshold.

17. The device according to claim 15, wherein the multiple access patterns are determined based on read and write information associated with the multiple components.

18. The device according to claim 15, wherein the first information includes information about behavioral characteristics of a user when accessing the corresponding component.

19. A computer program product that is tangibly stored on a computer-readable medium and includes machine-executable instructions, wherein the machine-executable instructions, when executed, cause a machine to perform actions, the actions comprising:
acquiring information about a set of candidate periods related to a workload of a storage system, the storage system having a workload lower than a first predetermined threshold during the set of candidate periods;
determining, by a machine learning model that is trained based on user information of the storage system, a target period for upgrade from the set of candidate periods; and
performing a firmware upgrade operation on at least a part of components among multiple components of the storage system during the target period,
wherein the user information includes a service level agreement (SLA) associated with a user of the system, and determining the target period for the upgrade includes:
determining a work task to be performed during a candidate period among the set of candidate periods;
determining, based on the work task, whether a performance impact to the work task as a result of performing the firmware upgrade operation during the candidate period enables the SLA to be satisfied; and
determining the candidate period as the target period for the firmware upgrade operation if it is determined that the SLA can be satisfied.

20. The computer program product according to claim 19, wherein the performance impact to the work task as a result of determining whether performing the firmware upgrade operation during the candidate period enables the SLA to be satisfied includes:
determining a first time at which the work task is previously executed if the work task includes at least one of a data recovery task, a data cleaning task, and a file system verification task;
determining a duration since the work task was previously executed based on a time difference between the first time and a current time; and
determining that the SLA cannot be satisfied if the time difference is greater than a time difference threshold.

* * * * *